(12) United States Patent
Siri et al.

(10) Patent No.: US 12,035,703 B2
(45) Date of Patent: Jul. 16, 2024

(54) SINGLE-HANDED TRAP

(71) Applicant: AAC Distributing, LLC, Syracuse, IN (US)

(72) Inventors: Anthony Michael Siri, Syracuse, IN (US); Mattison Scott Siri, Elkhart, IN (US)

(73) Assignee: AAC DISTRIBUTING, LLC, Syracuse, IN (US)

( * ) Notice: Subject to any disclaimer, the term of this patent is extended or adjusted under 35 U.S.C. 154(b) by 301 days.

(21) Appl. No.: 17/449,347

(22) Filed: Sep. 29, 2021

(65) Prior Publication Data
US 2022/0104475 A1    Apr. 7, 2022

Related U.S. Application Data

(60) Provisional application No. 63/086,159, filed on Oct. 1, 2020.

(51) Int. Cl.
*A01M 23/18* (2006.01)
*A01M 23/02* (2006.01)
*A01M 23/24* (2006.01)

(52) U.S. Cl.
CPC ............ *A01M 23/18* (2013.01); *A01M 23/02* (2013.01); *A01M 23/24* (2013.01)

(58) Field of Classification Search
CPC ....... A01M 23/16; A01M 23/18; A01M 23/20
USPC ..................................................... 43/60, 61
See application file for complete search history.

(56) References Cited

U.S. PATENT DOCUMENTS

| | | | | |
|---|---|---|---|---|
| 1,054,564 A | * | 2/1913 | Kline | A01M 23/18 43/61 |
| 1,228,802 A | * | 6/1917 | Maxwell | A01M 23/18 43/61 |
| 1,382,416 A | * | 6/1921 | Dresser | A01M 23/18 43/61 |
| 1,913,823 A | * | 6/1933 | Witte | A01M 23/18 43/61 |
| 2,167,291 A | * | 7/1939 | Bowman | A01M 23/00 43/61 |

(Continued)

FOREIGN PATENT DOCUMENTS

| DE | 593752 C | * | 3/1934 |
|---|---|---|---|
| DE | 202019103475 U1 | * | 8/2019 |

(Continued)

*Primary Examiner* — Darren W Ark
(74) *Attorney, Agent, or Firm* — Botkin & Hall, LLP; Michael D. Marston, Esq.

(57) ABSTRACT

An animal trap for safely trapping animals that may be safely set with a single hand. The trap has a frame with an opening and a pair of doors that are pivotally affixed to the frame adjacent to the opening. The doors are movable between an open and closed position. A rotating assembly is connected to each door through a corresponding linkage that are pivotally connected to the rotating assembly and one of the doors. The rotating assembly is rotatably affixed to the frame and rotatable between a set position and a tripped position about an axis. A spring biases one of the doors toward its closed position and when the rotating assembly is in its set position. A trigger mechanism is pivotally affixed to the frame and has a set position and a tripped position, rotating the trigger mechanism will trip the trap.

14 Claims, 15 Drawing Sheets

(56) References Cited

U.S. PATENT DOCUMENTS

| | | | | |
|---|---|---|---|---|
| 2,540,418 | A * | 2/1951 | McConnell | A01M 23/20 43/61 |
| 4,899,484 | A * | 2/1990 | Morin | A01M 23/20 43/61 |
| 5,299,380 | A * | 4/1994 | Fornal, Sr. | A01M 23/18 43/69 |
| 5,778,594 | A * | 7/1998 | Askins | A01M 23/20 43/61 |
| 6,164,008 | A * | 12/2000 | Kelley | A01M 23/02 43/61 |
| 6,684,560 | B2 * | 2/2004 | Lafforthun | A01M 23/16 43/67 |
| 9,204,627 | B1 * | 12/2015 | Comstock | A01M 23/16 |
| 2005/0097808 | A1 * | 5/2005 | Vorhies | A01M 23/20 43/61 |
| 2009/0094882 | A1 * | 4/2009 | Comstock | A01M 23/18 43/61 |
| 2009/0211146 | A1 * | 8/2009 | Radesky | A01M 23/18 43/61 |

FOREIGN PATENT DOCUMENTS

| | | | |
|---|---|---|---|
| JP | 2015073496 A | * | 4/2015 |
| JP | 2018130051 A | * | 8/2018 |

\* cited by examiner

SINGLE-HANDED TRAP

CROSS REFERENCE TO RELATED APPLICATIONS

This application is a Utility of the U.S. Application Ser. No. 63/086,159, filed Oct. 1, 2020, and claims the priority thereof and is hereby incorporated in its entirety by reference.

BACKGROUND OF THE INVENTION

This present disclosure relates to animal traps and other devices for safely trapping game, pests, and vermin such as raccoons, without injuring the animal. Many attempts have been made to design a safe and easy to use trap, such as U.S. Pat. Nos. 5,299,380, 6,684,560, and 9,204,627. Many of these traps require two hands to set. The trap is frequently used in an inconvenient or difficult-to-access location because it must be located where animals to be trapped are located. Many times, the user is on a ladder and carrying the trap with them to set it on a roof or elevated location. Any trap that requires more than a single hand poses a significant safety risk for the user, as setting it would require them to take both hands off of the ladder, drastically increasing the risk of a fall. An improved trap is needed.

SUMMARY OF THE INVENTION

The present disclosure describes a trap that can be used to capture a pest without harming it. The trap can be set with a single hand and a single motion. A rotating mechanism with linkages to a door is rotated to a set position that moves the door to an open position and also moves a trigger to a set position. Movement of the trigger in either direction causes the rotating mechanism to move the door to the closed position.

DESCRIPTION OF THE PREFERRED EMBODIMENT

A single-handed trap 10 is shown in FIGS. 1-16 without the outer mesh skin to better show the internal structure and moving components. Although a wire mesh can be used as an outer skin over a frame 14, it is contemplated that other skins could be used instead of mesh. Materials such as plastic, sheet metal, or other materials that provide an appropriate level of ventilation while preventing the animal contained within the trap 10 from escaping are contemplated. The shape of the frame 14 is not limited to the square section as shown and can be any shape as the user requires. The device, as shown in the FIGS, has openings 16, 18 at opposite ends that are not covered in mesh skin. The trap 10 can be configured with a single opening, and in that event, one of the openings would be covered with mesh skin. The frame 14 is formed from an assembly of individual members and has a variety of mounting points for other components. The members of the frame 14 can be welded, riveted, screwed, or otherwise connected to form a rigid structure. It is contemplated that the frame 14 and mesh skin may be integrated. In this instance, the mesh skin would have structural properties or integral components, and the attachment points of the mechanism would be incorporated into that structure. The frame 14 maintains the position of the components, along with pivot points to maintain proper geometry for the moving components.

Figure 1:
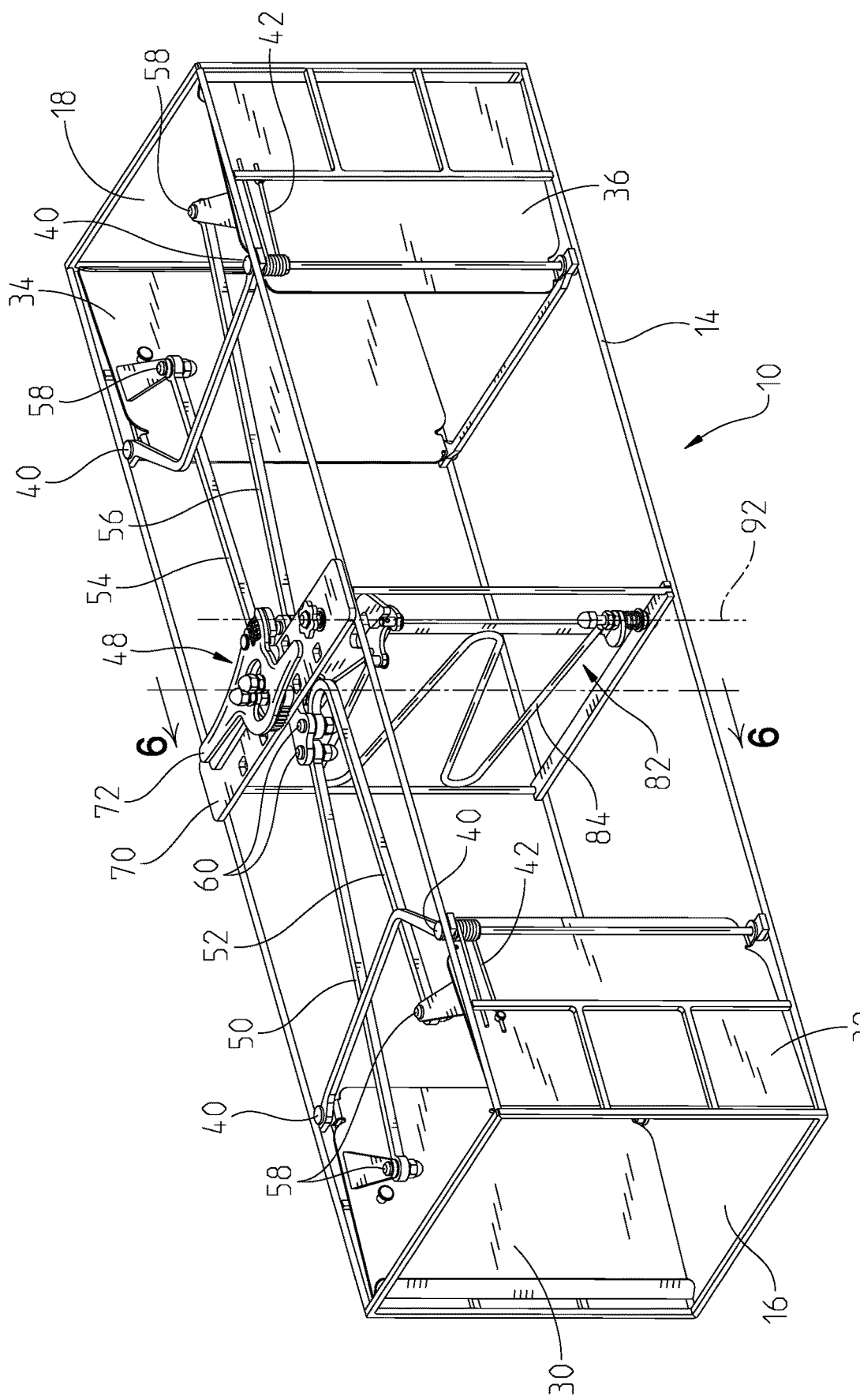
FIG. 1 is a perspective view of the trap in the open position.
Figure 5:
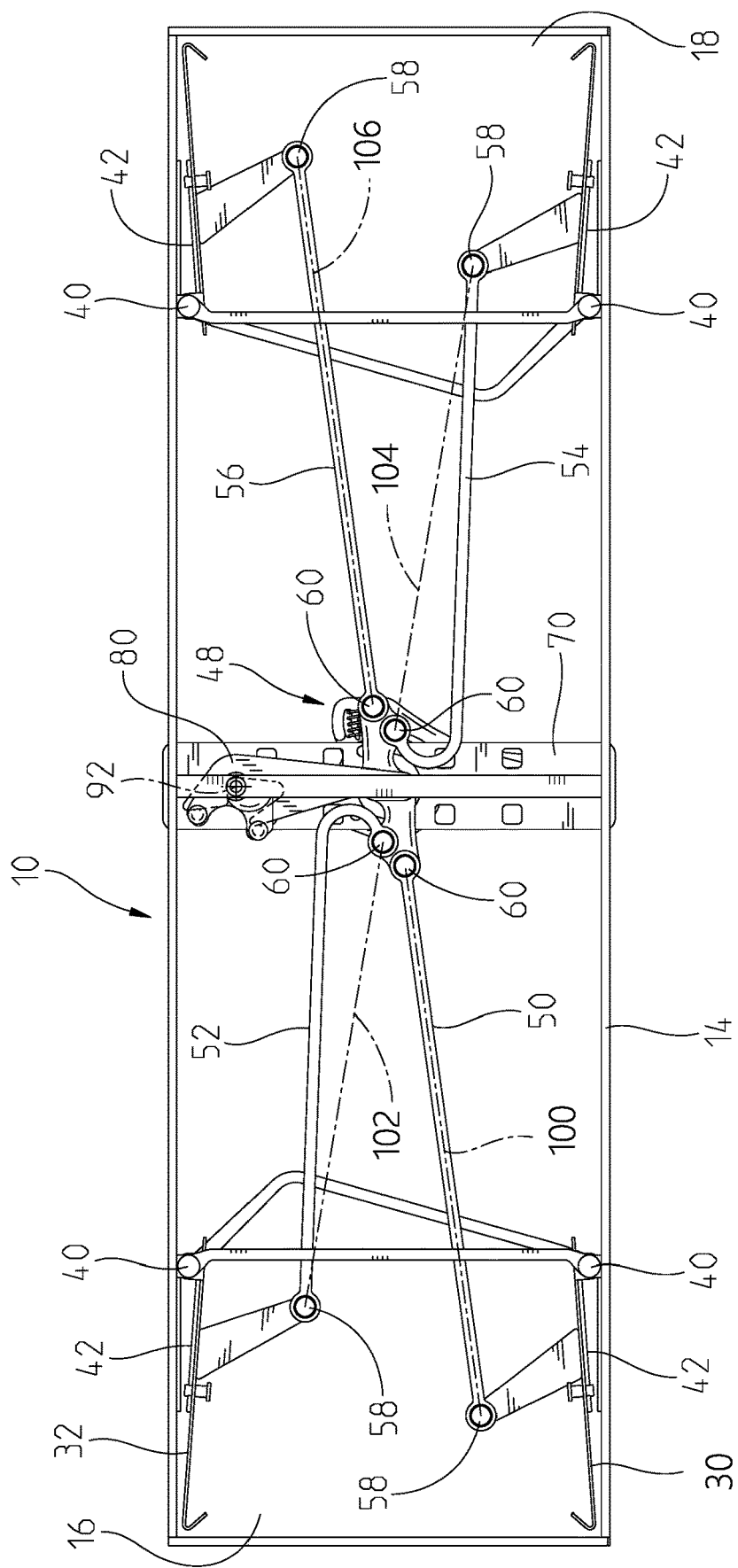
FIG. 5 is a bottom view of the animal trap showing the doors open.
Figure 10:
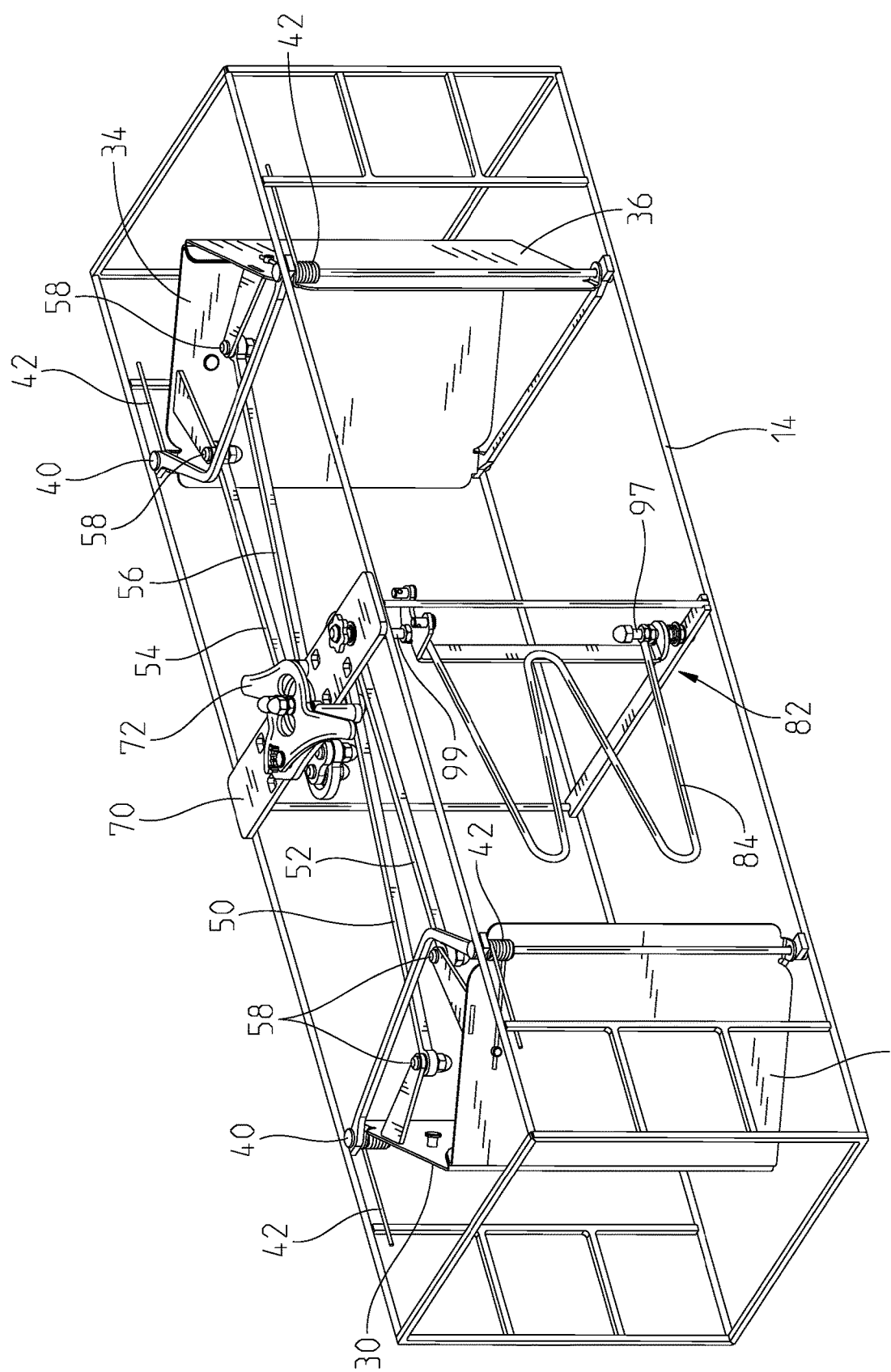
FIG. 10 is a perspective view of the trap with the doors in the closed position.
Figure 11:
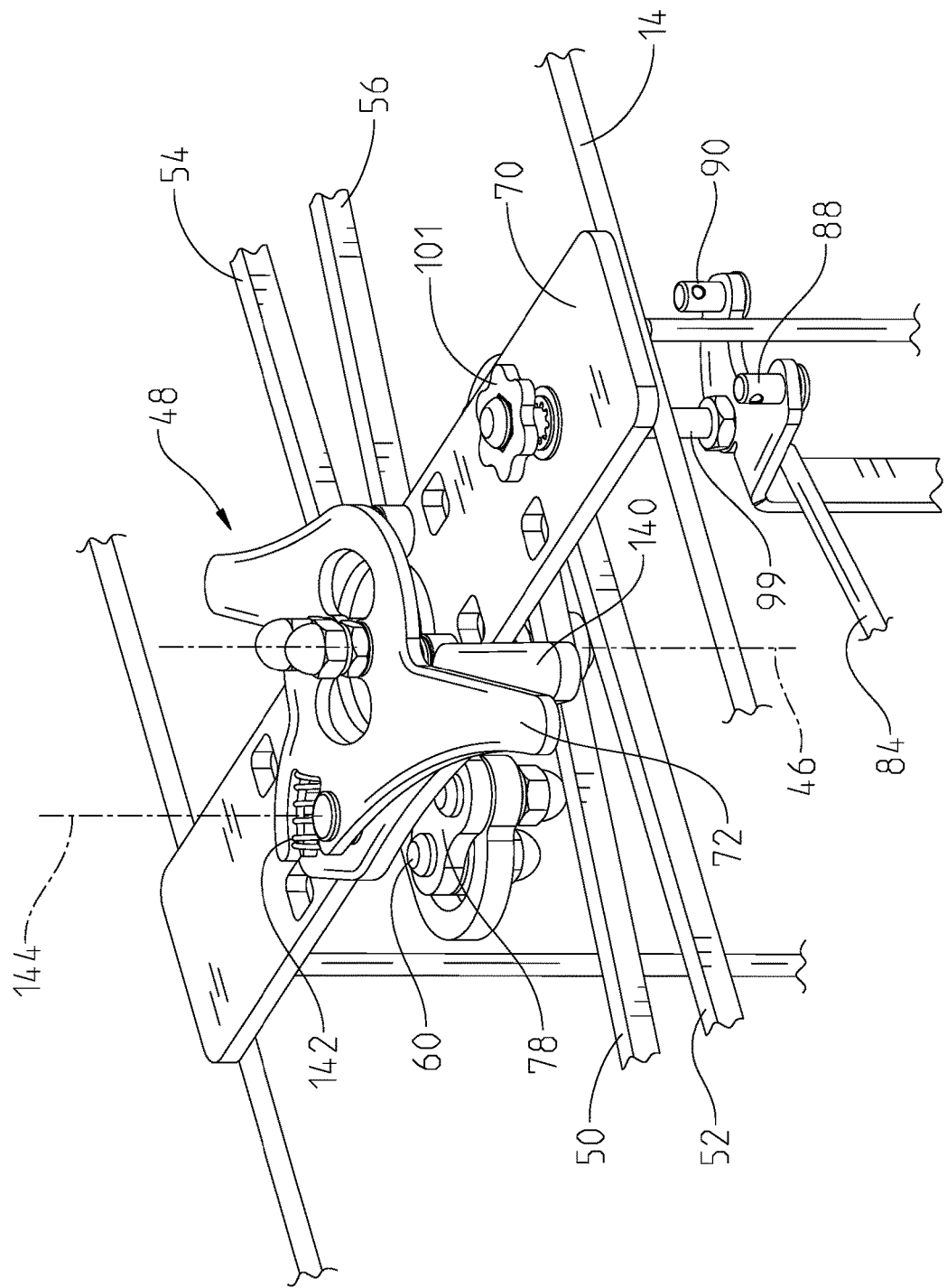
FIG. 11 is a magnified view of the handle viewed from the top above the rotating assembly with the doors in the closed position.
Figure 12:
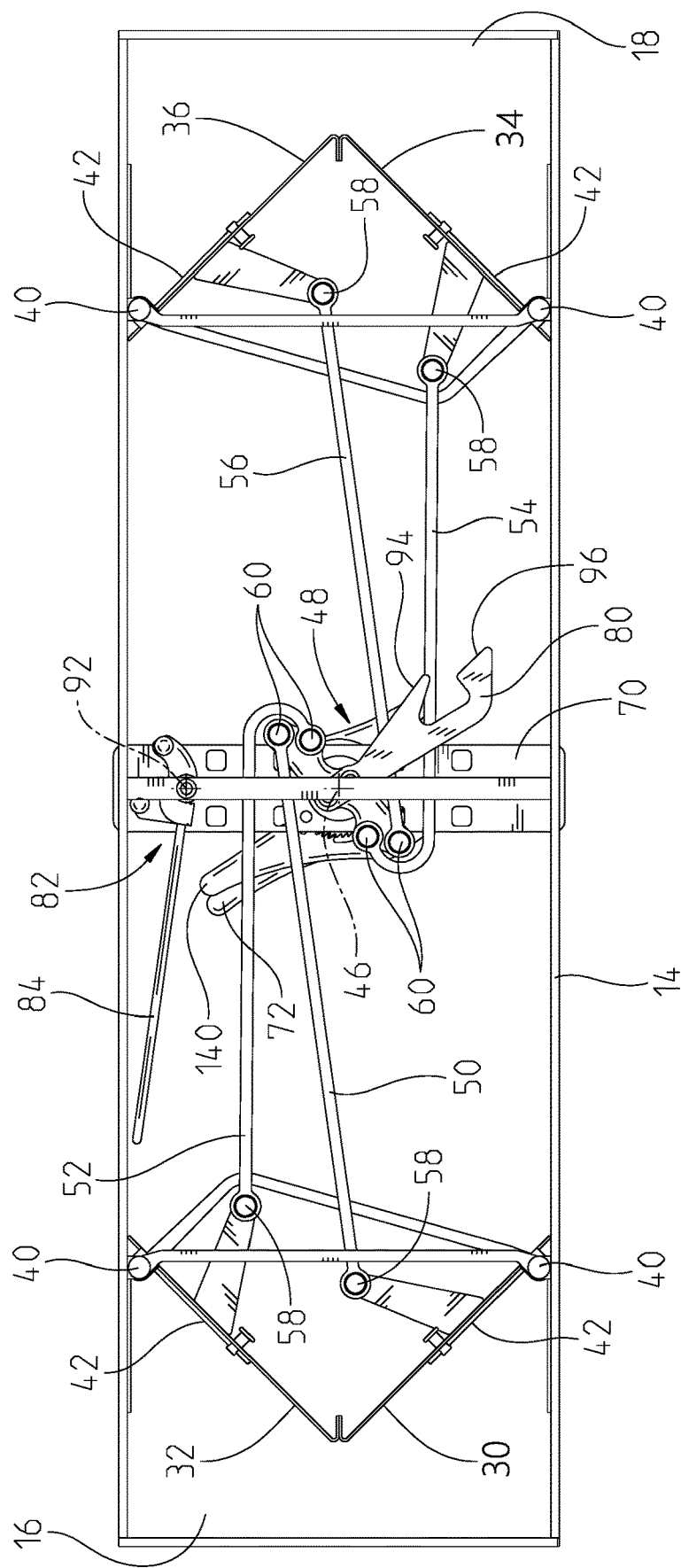
FIG. 12 is a bottom view of the trap with the doors in the closed position.
Figure 13:
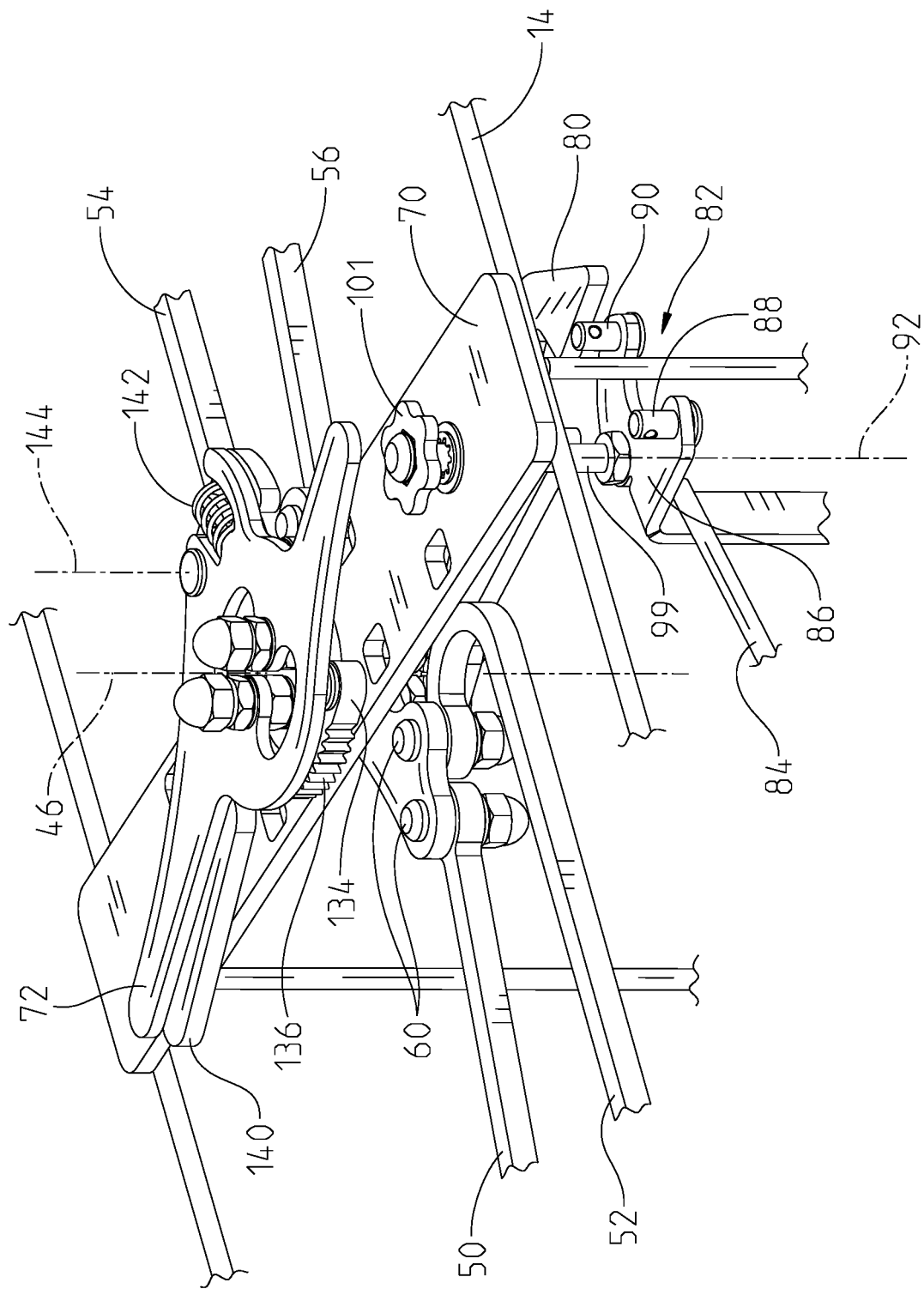
FIG. 13 is magnified view of the rotating assembly shortly after the trigger arm has moved to trip the trap showing how the sear is moved from its set position.

Located just inside the frame 14, at the opening 16, are doors 30, 32. At the opposite end of the frame, at opening 18, are doors 34, 36. The doors 30, 32, 34, 36 are connected to the frame at pivots 40. The doors are movable between an open position, as shown in FIGS. 1 and 5, and a closed position, as shown in FIGS. 10 and 12. The open position corresponds to the doors 30, 32, and 34, 36 adjacent to each other being substantially clear of said opening 16, 18 enough to let an animal into the trap 10. Springs 42 are shown in FIGS. 1, 7, 10, and 12 are at the pivots 40 to urge the doors 30, 32, 34, 36 towards the closed position. Although springs 42 are torsional springs located near pivots 40, other springs may be incorporated at locations other than the pivots 40 to urge the doors 30, 32, 34, 36 towards the closed position. The doors are connected to a rotating assembly 48 through linkage arms 50, 52, 54, 56. The linkage arms 50, 52, 54, 56 are shown as a bar or rod with pivot points 58, 60 located at terminal ends. One of the pivot points 58 is connected to a corresponding door 30, 32, 34, 36 and the other pivot point 60 is connected to the rotating assembly 48. The pivots 40 allow the rotating assembly 48 to simultaneously move all the doors 30, 32, 34, 36 between the opened and closed positions.

The rotating assembly 48 is located in the middle of the trap 10 and rotates with respect to a mounting plate 70 about a central axis 46. The rotating assembly 48 rotates about the central axis 46 between a set position and a tripped position.

The set position is shown in FIGS. 1-3 and 5, and corresponds to doors 30, 32, 34, 36 being open. A tripped position is shown in FIGS. 10-13 and corresponds to the doors being held closed in a locked position. The mounting plate 70 is affixed to the frame 14 and allows the rotating assembly 48 to rotate with respect to the mounting plate 70 and the frame 14. The rotating assembly has a central hub 49 with flanges 51 that straddle the mounting plate 70 so that the rotating assembly 48 can rotate with respect to the mounting plate 70. The rotating assembly 48 has a handle 72 that rotates with the rotating assembly 48. The handle 72 is accessible to the user from outside the trap 10. Rotating the handle 72 and the entire rotating assembly 48 in the clockwise direction as viewed from the top moves the doors 30, 32, 34, 36 toward the open position. As the doors 30, 32, 34, 36 move toward the closed position, the handle 72 and entire rotating assembly 48 rotates counterclockwise as viewed from the top.

Figure 2:
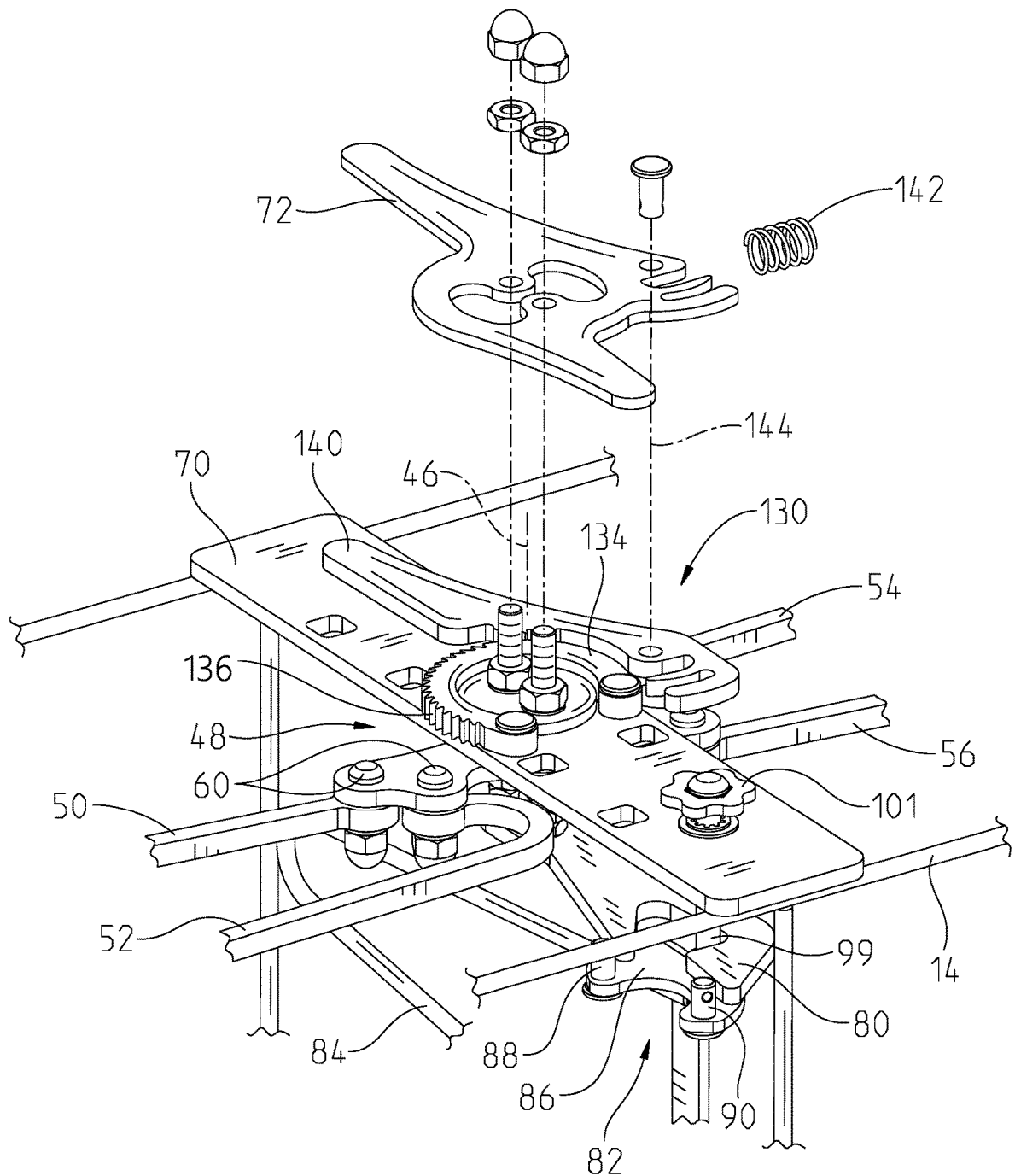
FIG. 2 is an exploded view of the trap shown in FIG. 1 focusing on the handle and rotating assembly.
Figure 3:
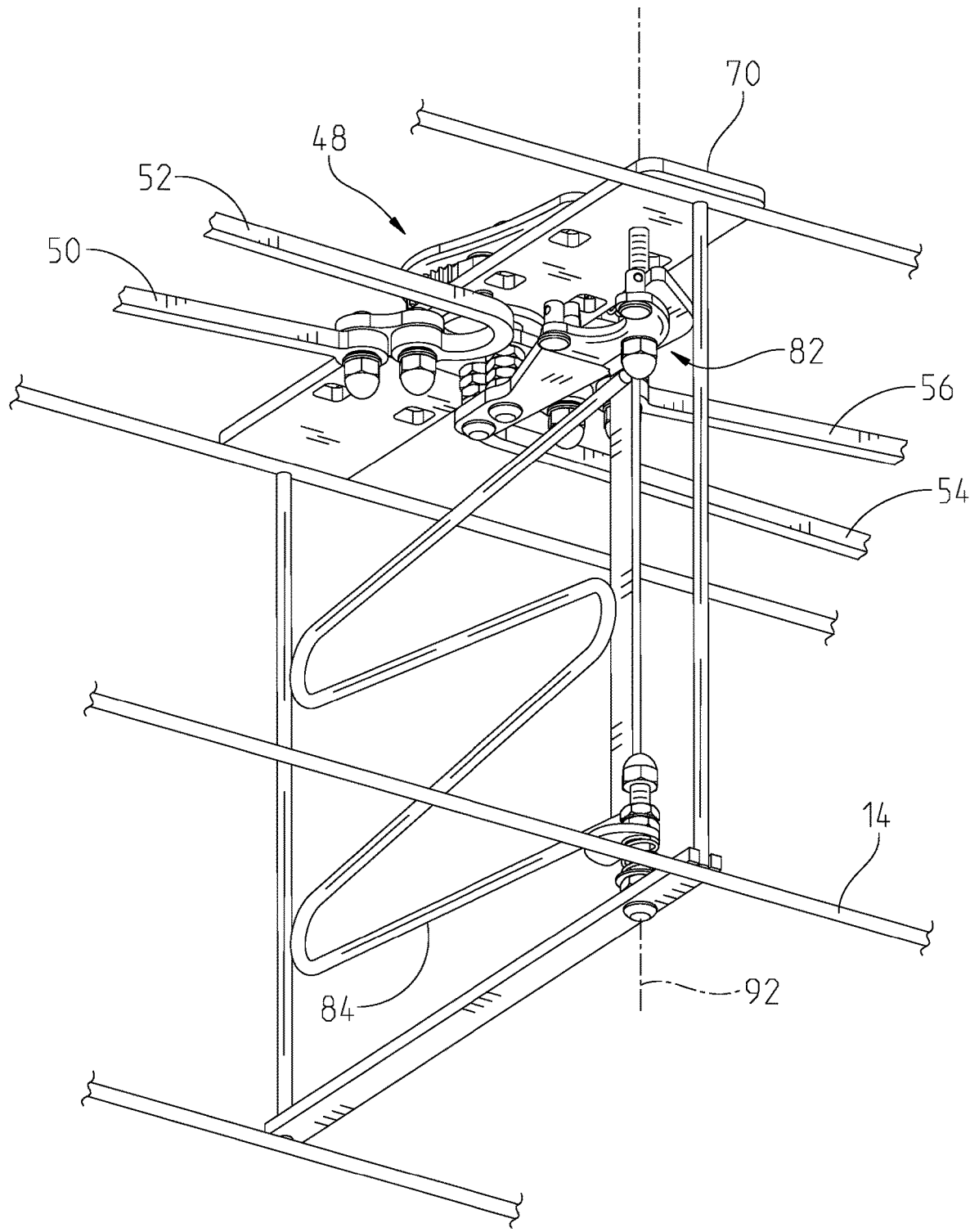
FIG. 3 is a view showing the bottom side of the rotating assembly shown in FIG. 2 and showing the trigger arm.
Figure 4:
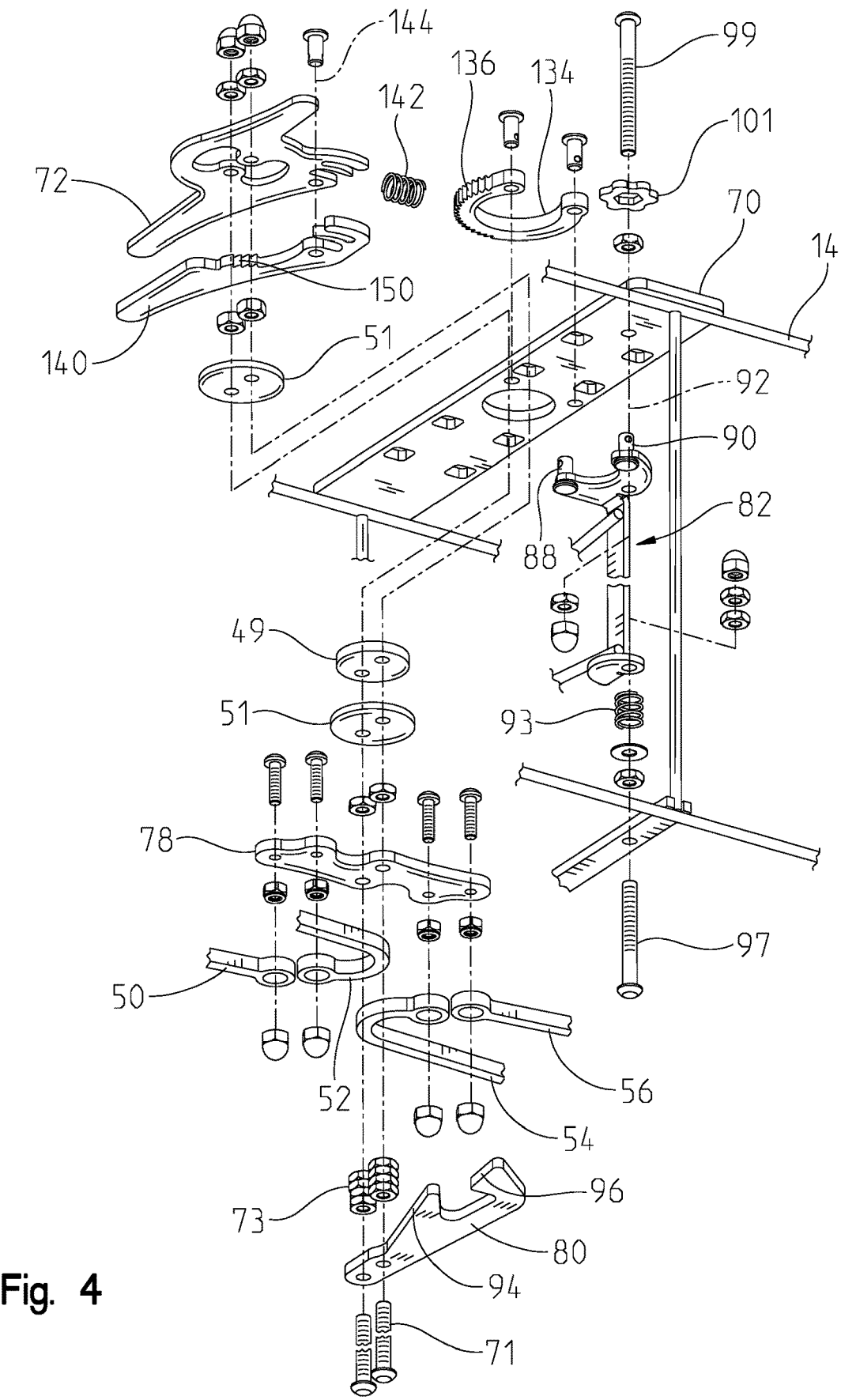
FIG. 4 is an exploded view of the rotating assembly showing a portion of the trigger arm.
Figure 6:
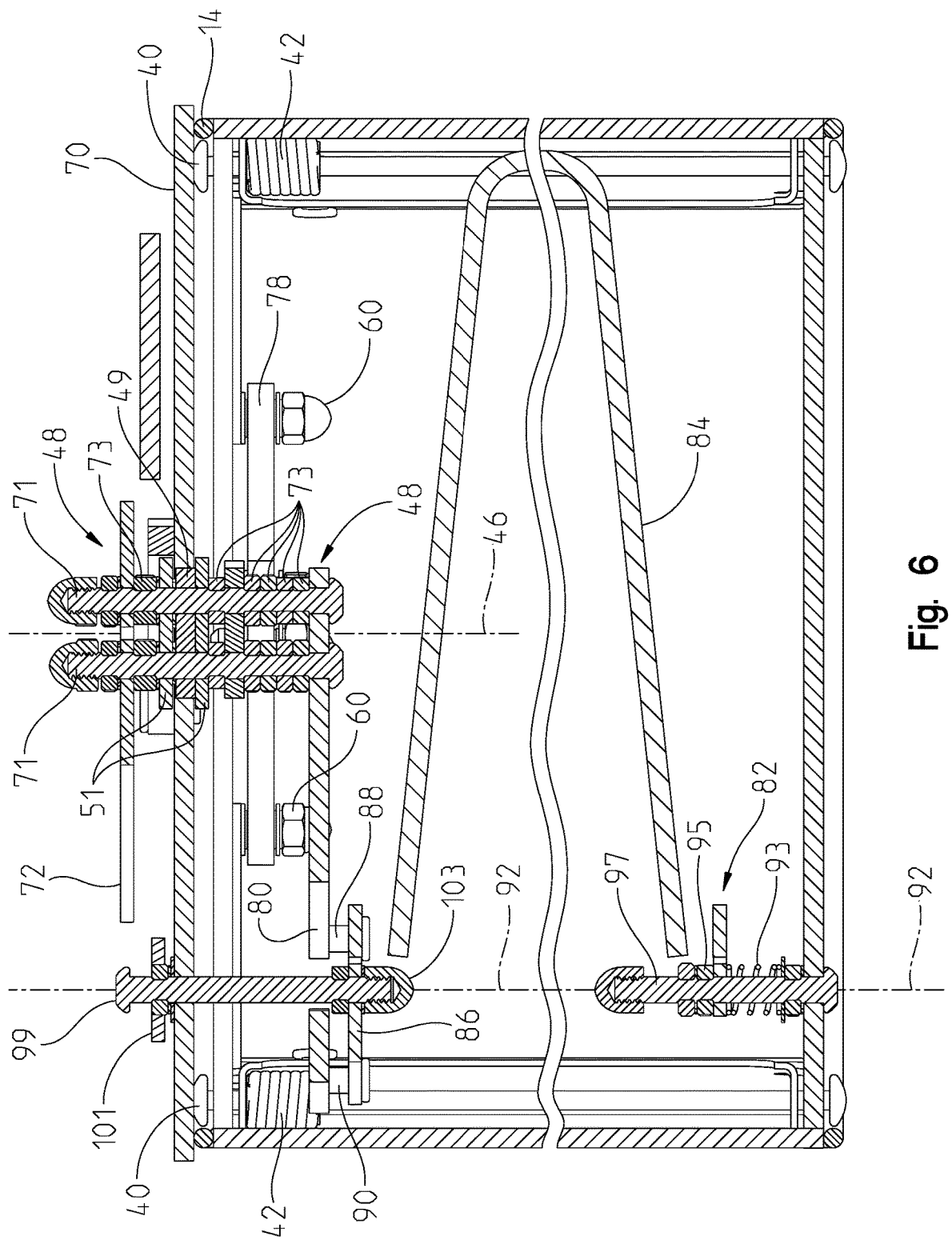
FIG. 6 is a sectional view taken about line 6-6 in FIG. 1.
Figure 7:
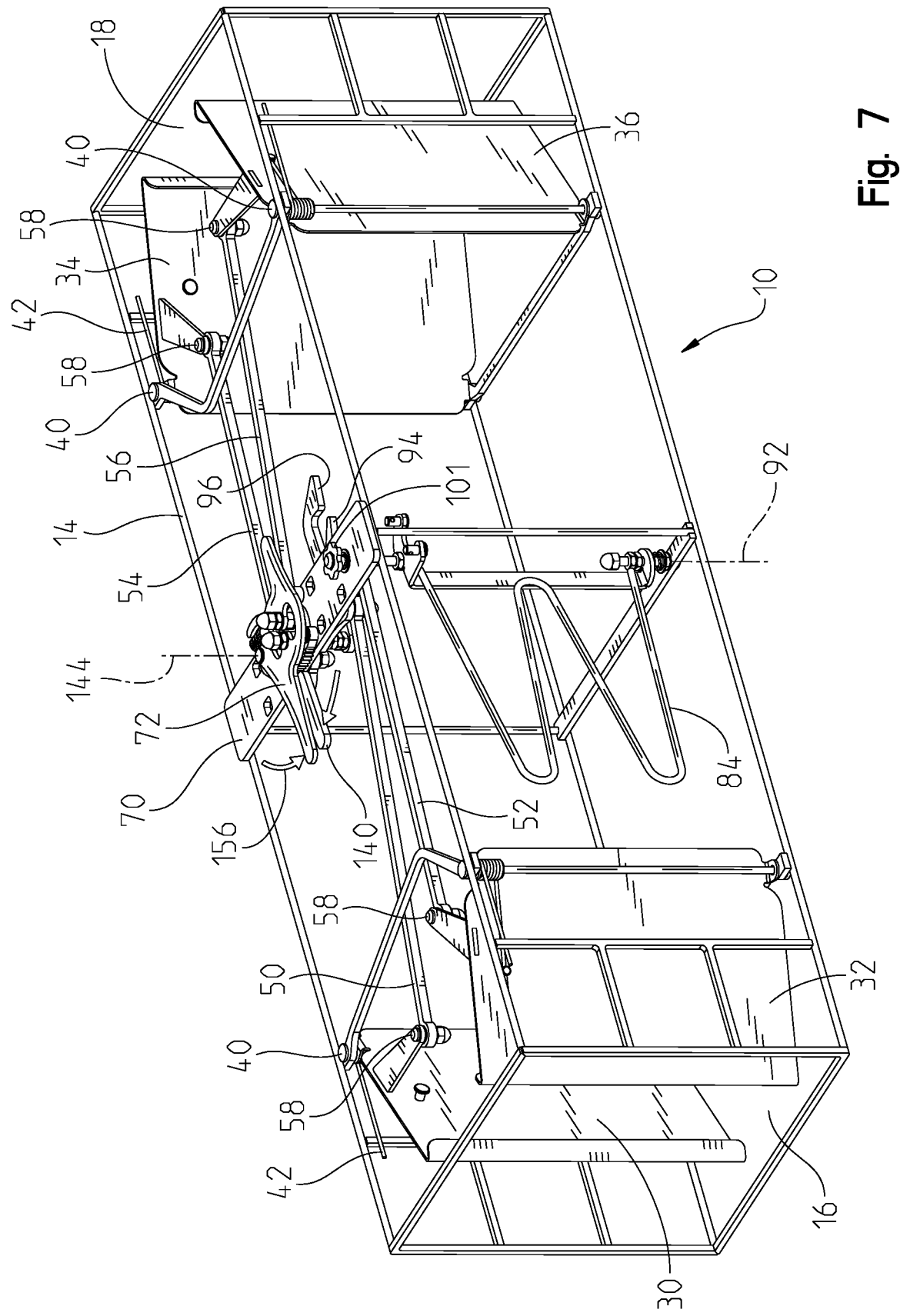
FIG. 7 is a perspective view showing the top of the trap shown in the previous FIGS. with the doors between the open and closed positions.
Figure 8:
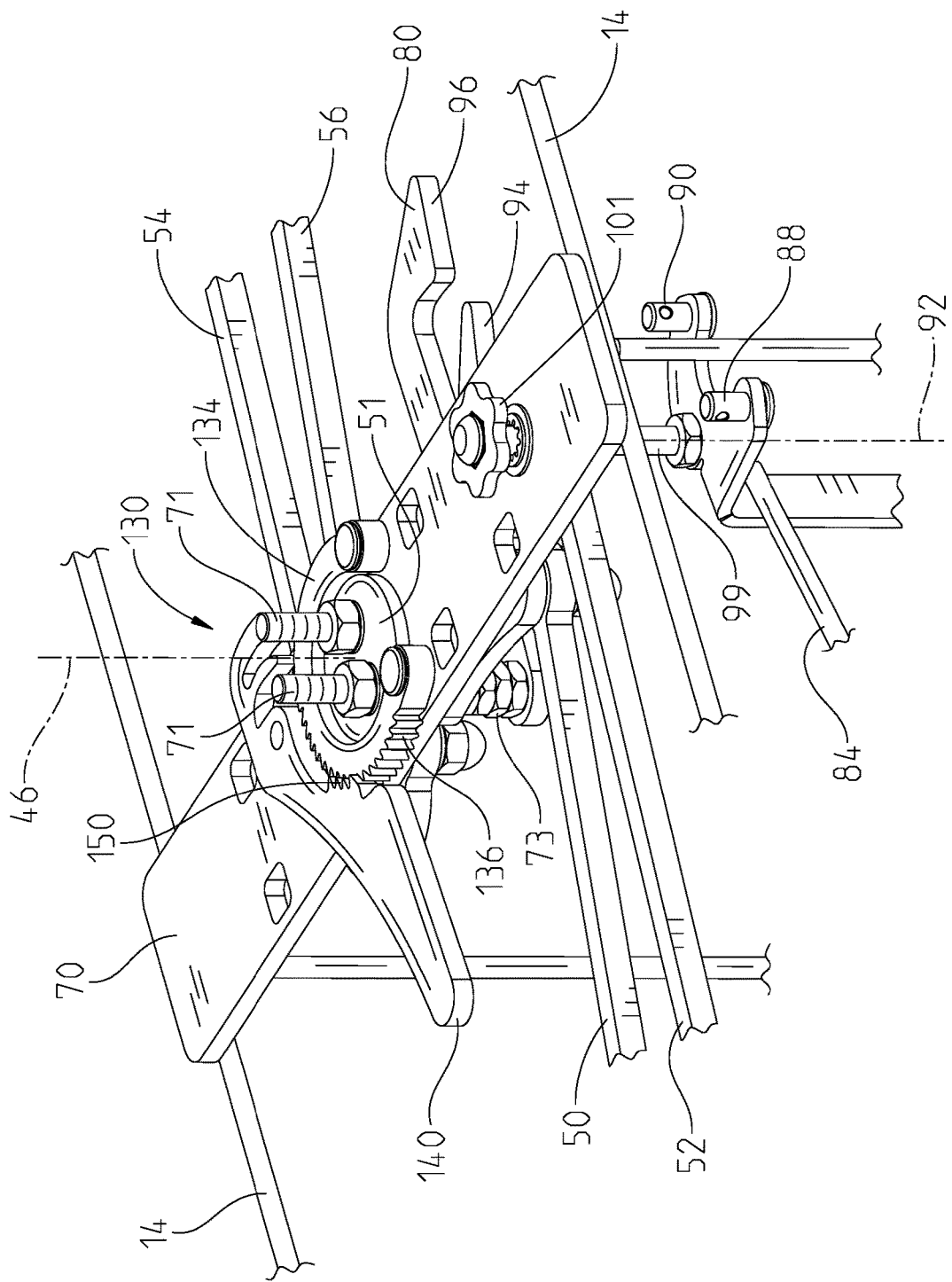
FIG. 8 is magnified view of the locking mechanism as viewed from the top with the doors between the open and closed positions.
Figure 9:
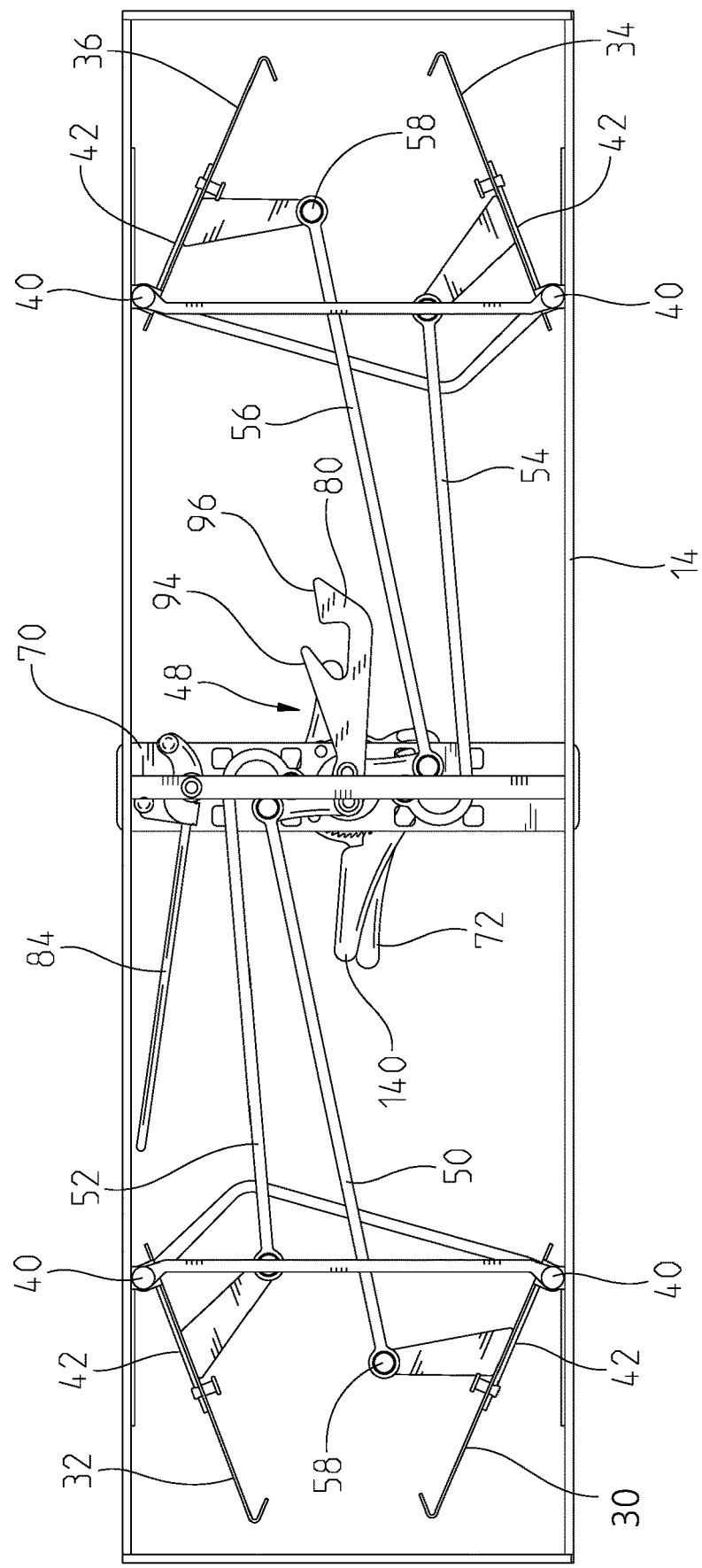
FIG. 9 is a bottom view of the trap with the doors between the open and closed positions.

The rotating assembly 48 includes a spider 78 and a sear 80 that are affixed to each other and rotate as part of the rotating assembly 48. The spider 78 is on the inside of the trap 10 opposite the handle 72. The spider 78 connects to the linkage arms 50, 52, 54, 56 at pivot points 60. The sear 80 is another part within the rotating assembly 48 and extends outwardly from it to engage with parts of a trigger mechanism 82. FIG. 4 shows how the parts of the rotating assembly 48 are held together with bolts 71 and nuts 73 that set appropriate spacing of the components of the rotating assembly 48. The spacing of the components of the rotating assembly are well shown in FIG. 6. In the set position of the rotating assembly 48, the sear 80 is located directly beneath the mounting plate 70 as shown in FIG. 1. The trigger mechanism 82 has a trigger arm 84 and rotates about a trigger axis 92. As shown in FIGS. 1, 3, 7, 10, 14, and 15, the trigger arm 84 is formed from bent wire. Other materials for the trigger arm 84 are contemplated, such as polycarbonate, formed rods, wire, and laser cut materials. It is contemplated that the entire trigger mechanism 82 may be replaced by an electronic device. The trigger arm 84 is movable between a set and tripped position. The set position is shown in FIGS. 1-3 and tripped position is shown in FIGS. 7, 9 and 10. The set position locates the trigger arm 84 directly below the mounting plate 70 as shown in FIG. 1. Rotation of the trigger arm 84 in either direction about the trigger axis 92 away from the position shown in FIG. 1 will trip the trap 10. This rotation of the trigger arm away from the position shown in FIG. 1 in either direction corresponds to the tripped position of the trigger arm 84. This rotation of the trigger mechanism 82 to the tripped position in either direction allows the trap 10 to catch an animal if it ran from opening 16 towards opening 18 or from opening 18 towards opening 16. In the set position, the trigger arm 84 is positioned such that if an animal would attempt to run through the trap 10 or pull on the trigger arm 84, it would contact the trigger arm 84 and move it from the set position towards the tripped position. That rotation from the set position of the trigger arm 84 shown in FIG. 1 depends on which direction the animal moved through the trap.

Figure 15:
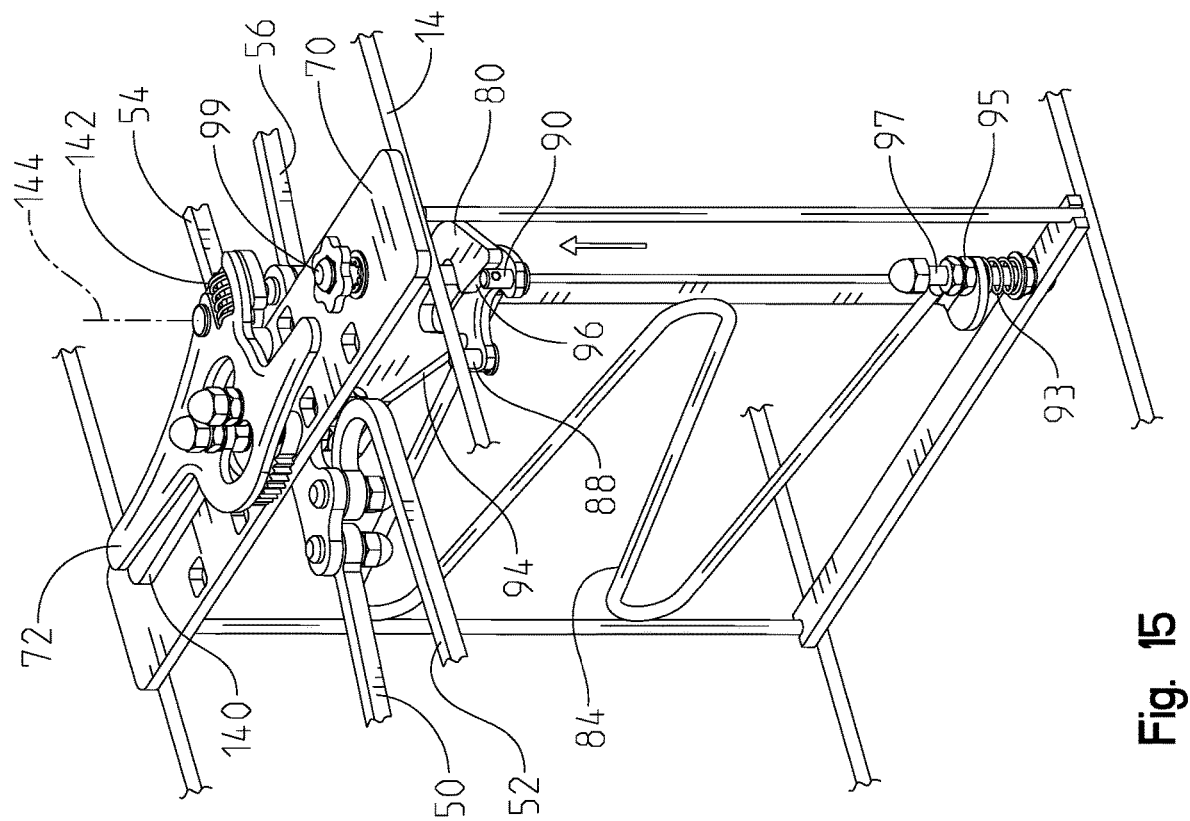
FIG. 15 shows the trigger arm with the pins affixed to the trigger arm in its raised position so the pins are in alignment to engage the sear.
Figure 14:
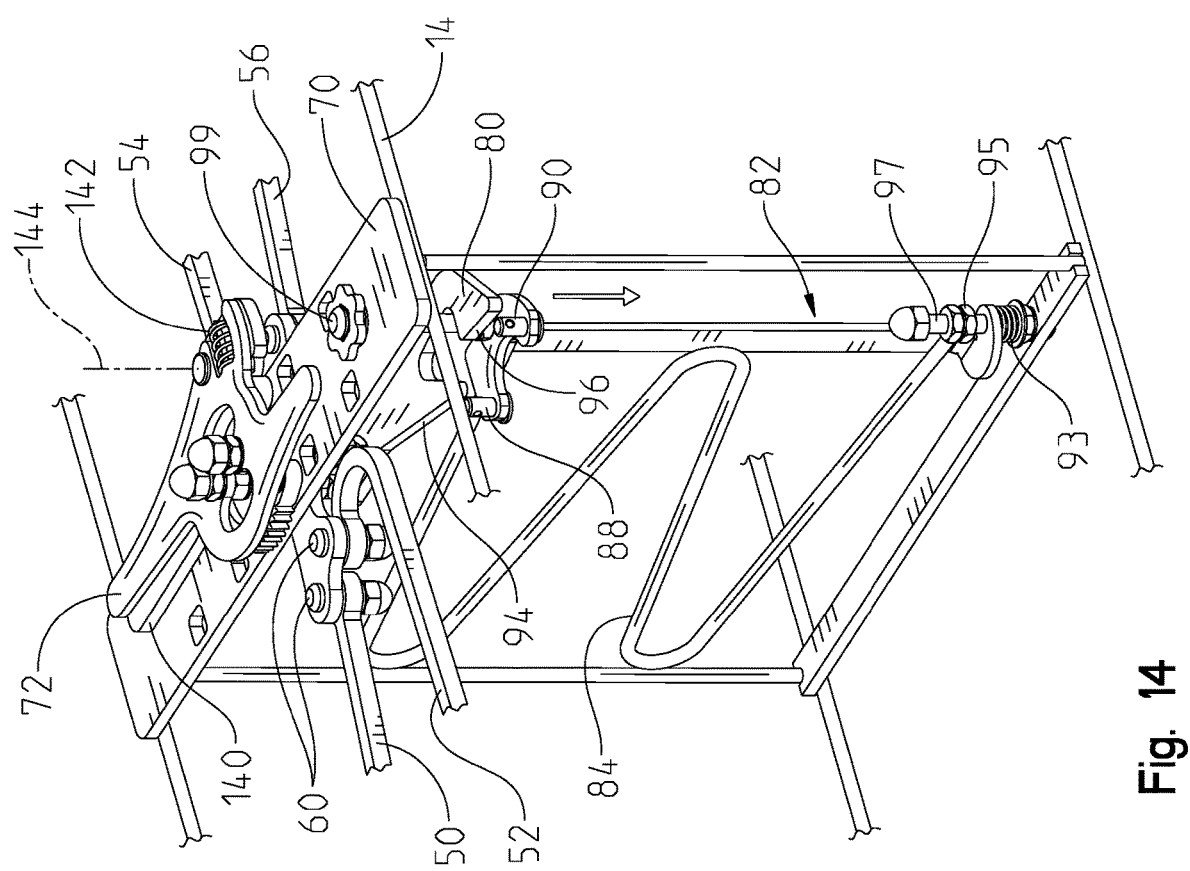
FIG. 14 shows the trigger arm with pins affixed to the trigger arm in its lowered position so the pins are below the sear.
Figure 16:
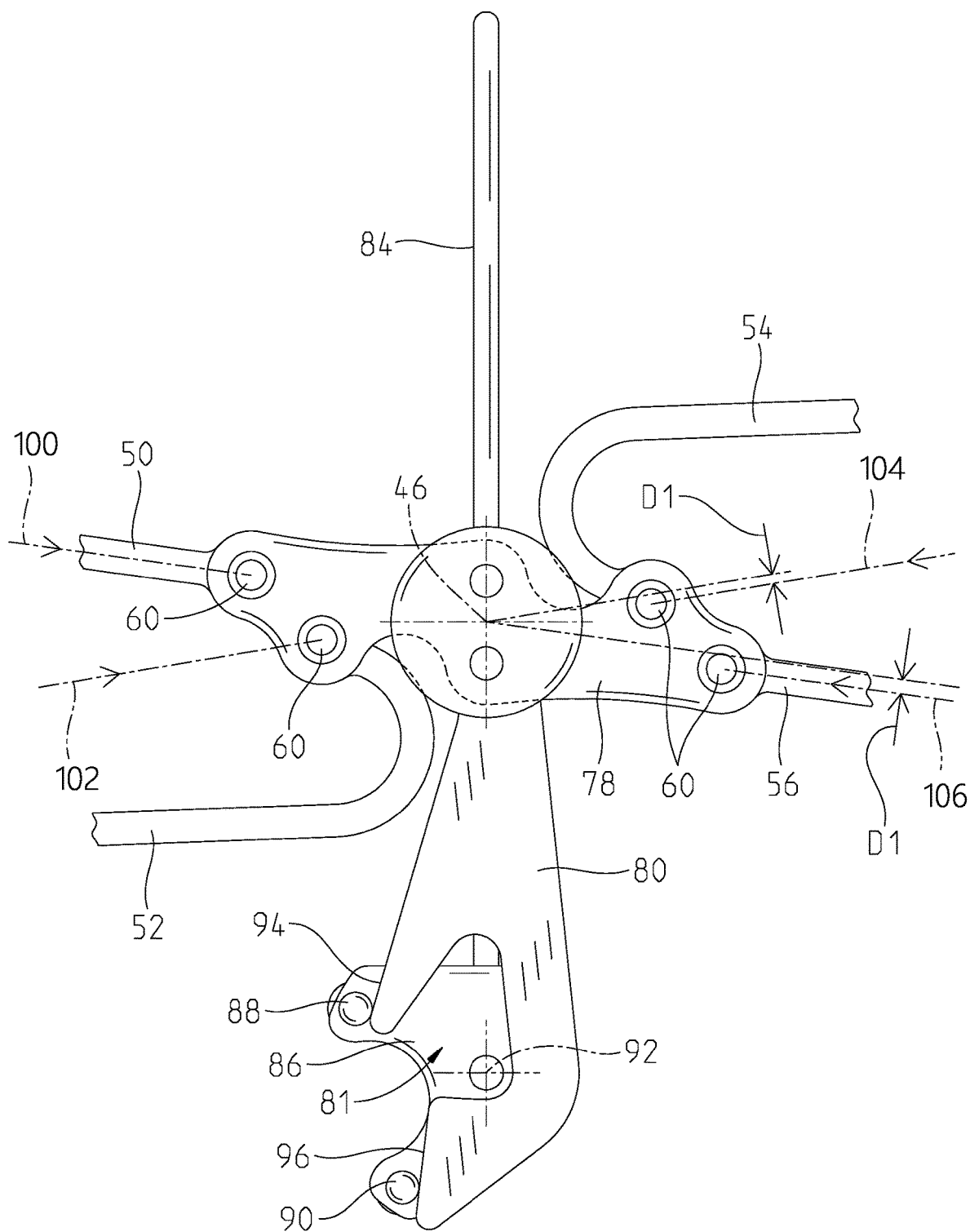
FIG. 16 is a top view of the sear adjacent to the pins connected to the trigger arm.

The trigger mechanism 82 includes a plate 86 connected to the trigger arm 84 that has a first pin 88 and a second pin 90. The pins 88, 90 engage with the sear 80 on opposite sides of a sear notch 81. The set position of the rotating assembly 48 and the trap 10 are characterized by the pins 88, 90 being held adjacent to the sear 80 as shown in FIGS. 1, 15 and 16. The pins 88, 90 contact trip surfaces 94, 96 that are located adjacent to the sear notch 81. The set position of the trigger arm 84 corresponds with the pins 88, 90 engaging with corresponding trip surfaces 94, 96 when the rotating assembly 48 is in its set position. As viewed from the top, the trigger arm 84 can rotate clockwise or counterclockwise about the trigger axis 92 from the set position to the tripped position. The sear 80 extends radially outward of the central axis 46 so that the trigger mechanism 82 can exert appropriate leverage on the sear 80 to easily facilitate movement of the sear 80 and rotating assembly 48 when the pins 88, 90 are urged into the sear 80 as the trigger arm 84 is rotated in either direction. In addition to this rotational movement about the trigger axis 92, the trigger mechanism 82 may translate along the trigger axis 92. Spring 93 biases the trigger mechanism 82 upwardly against a lower stop 95 that consists of a nut on a lower pivot rod 97 fixed with respect to the frame 14. FIGS. 6 and 15 show the trigger mechanism 82 biased against the lower stop 95 and this corresponds to a raised position of the trigger mechanism 82. Opposite the lower pivot rod 97 is an upper pivot rod 99. The centers of the lower pivot rod 97 and upper pivot rod 99 form the pivot axis 92 about which the trigger mechanism 82 rotates. The upper pivot rod 99 has an adjustment nut 101 that is threaded onto the upper pivot rod 99 on the outside of mounting plate 70. Tightening the adjustment nut 101 pulls on the cap nut 103 and pulls the entire trigger mechanism 82 towards the mounting plate 70 which pulls the bottom of the trigger arm 84 upwardly against the lower stop 95. The friction generated by tightening of the adjustment nut 101 causes the trap 10 to be less sensitive because it will take more force to move the trigger arm 84 as the adjustment nut 101 is tightened. The other extreme of tightening the adjustment nut 101 is loosening the adjustment nut 101 away from the mounting plate 70 so the entire trigger mechanism 82 may be pushed downwardly against the spring 93 on the lower pivot rod 97 as shown in FIG. 14. When the entire trigger mechanism 82 is pushed down enough, the pins 88, 90 may be located below the sear 80, this corresponds to a lowered position of the trigger mechanism 82. The lowered position of the trigger mechanism 82 is shown in FIG. 14. When the trigger mechanism 82 is in the raised position, the pins 88, 90 will engage the sear 80. When the trigger mechanism 82 is moved to the lowered position, the pins 88, 90 will be located below the sear 80 and not engage the sear 80. This enables the trigger arm 84 to be moved without moving the sear 80. The trap 10 will not be tripped when the trigger mechanism 82 is in its lowered position because the pins 88, 90 will not engage the sear 80.

When the trap 10 is set, the pins 88, 90 are in biased contact with their corresponding trip surfaces 94, 96. The trigger axis 92 is through the sear notch 81 and provides geometry that allows the trip surfaces 94, 96 to straddle the sear notch 81 and the pins 88, 90 to rotate about an axis 92 that is between the trip surfaces 94, 96. Thus, any movement by the trigger mechanism 82 from the set position will cause one of the pins 88, 90 to push against one of the trip surfaces 94, 96 while the other pin 90, 88 will move away from its corresponding trip surface 96, 94. This causes the rotating assembly 48 to begin to move towards the tripped position. Movement of the trigger arm 84 and the pins 88, 90 from the set position to the tripped causes counterclockwise movement of the handle 72 as viewed from the top as well as movement of the entire rotating assembly 48 in the same direction.

In the set position of the trap 10, shown in FIG. 1, the springs 42 urge the doors 30, 32, 34, 36 toward their closed positions and in so doing, the springs 42 push on each corresponding linkage arm 50, 52, 54, 56 connected to each door 30, 32, 34, 36. The compressive force exerted by the springs on each of the linkage arms 50, 52, 54, 56 acts through a line of action 100, 102, 104, 106 that extends through the centers of each pivot 58, 60 on either end of the linkage arms 50, 52, 54, 56. As stated above, pivot 58 is where each linkage arm 50, 52, 54, 56 pivotally connects to its corresponding door 30, 32, 34, 36, and pivot 60 is where each linkage arm 50, 52, 54, 56 pivotally connects to the spider 78. The locations for the lines of action 100, 102, 104, 106 are shown in the set position of the trap 10 in FIG. 5, which is a bottom view. FIG. 5 provides an overview of the how the compressive forces of the springs 42 act on the linkage arms 50, 52, 54, 56 from a bottom view. FIG. 16 is a top view with the mounting plate 70 removed for clarity that shows a more detailed view of how the forces of the springs 42 acting through lines of action 100, 102, 104, and 106 relate to the central axis 46 of the rotating assembly 48.

The relationships of the lines of action 100, 102, 104, 106 are critical to the operation of the trap 10. Although the springs 42 act on each door 30, 32, 34, 36 to urge each of them toward their closed position, the doors 30, 32, 34, 36 are prevented from closing. This prevention from closing despite each door 30, 32, 34, 36 being urged toward its closed position is accomplished by the location of the lines of action 100, 102, 104 and 106. The lines of action 100, 102, 104, 106 are offset from the central axis 46 of the rotating assembly 48 as shown in FIG. 16. For clarity, FIG. 16 includes arrows to show the direction that the force from each spring 42 acts along its corresponding line of action 100, 102, 104, 106. This offset distance from the central axis 46 is shown as D1 in FIG. 16. As can be seen, the offset D1 causes the forces from the springs 42 urge the spider 78 and entire rotating assembly 48 in a clockwise direction as shown in FIG. 16. This causes the sear 80 to rotate into pins 88, 90. The pins 88, 90 restrain further clockwise rotation of the sear 80 and the rest of the rotating assembly 48. That restraint on rotation restrains the spider 78 and therefore, restrains the linkage arms 50, 52, 54, 56 connected to the spider 78. As rotating assembly 48 is caused to rotate counterclockwise as viewed from the top in FIG. 16, the offset D1 will decrease to a point where the lines of action 100, 102, 104, 106 are directly in line with the central axis 46 about which the spider 78 rotates. This direct alignment is an equilibrium point because the forces acting through lines of action 100, 102, 104, 106 will be in equilibrium. Further rotation beyond the equilibrium point will shift the offset of the lines of action 100, 102, 104, 106 so that force of the springs 42 will tend to rotate the spider 78 and entire rotating assembly 48 in a counterclockwise direction as viewed from the top as shown in FIG. 16. This further rotation beyond the equilibrium point locates the lines of action 100, 102, 104, 106 in a location that generates a moment that urges the rotating assembly 48 so that the sear 80 is urged away from pins 88, 90 of the trigger mechanism 82. Rotating the rotating assembly 48 in a counterclockwise direction as viewed from the top in FIG. 16 will simultaneously close all of the doors 30, 32, 34, 36 through their connection via the linkage arms 50, 52, 54, 56 through the spider 78. It may be the case that a single spring 42 with enough force at a single door 30, 32, 34, or 36 could provide enough force to close all of the doors 30, 32, 34, and 36 once the spider 78 has rotated counterclockwise beyond the equilibrium point. The geometry of the sear 80 is chosen so that the trip surfaces 94, 96 rest on the pins 88, 90 at a location that provides a rotational offset that prevents closing of the doors 30, 32, 34, 36 through action of the springs 42 when the trap 10 is in its set position as shown in FIGS. 1 and 16. This location is one way in which the sensitivity of the trap 10 may be influenced because the trigger arm 84 will have to rotate a certain predetermined amount to move the spider 78 and rotating assembly 48 beyond the equilibrium point so that springs 42 will continue counterclockwise rotation (as shown in FIG. 16) to close all of the doors 30, 32, 34, 36. An appropriate location for the set position of the trap 10 as set by the sear 80, shown in FIG. 16, is where the rotating assembly 48 is approximately three degrees beyond the equilibrium point. Of course, it is possible for that location of the rotating assembly 48 to be more or less than three degrees as may be desired for certain situations in which the trap 10 may be used. Having the rotating assembly 48 in the set position being more degrees clockwise of the equilibrium point will necessitate the trigger arm 84 and entire trigger mechanism 82 rotate more degrees to move the sear 80 and entire rotating assembly 48 beyond the equilibrium point and thus, make the trap 10 less sensitive to being tripped. It may be possible to have the set point of the trap 10 be at the equilibrium point, however, machining tolerances and sensitivity make it preferable in practice to have the set point of the trap slightly beyond the equilibrium point as described and shown in FIG. 16. Generally speaking, the tripped position of the trigger mechanism 82 is when the trigger mechanism 82 is rotated in either direction such that one of the pins 88, 90 has pushed the sear 80 to a location that aligns the lines of action 100, 102, 104, 106 to a location that allows the springs 42 to simultaneously close all of the doors 30, 32, 34, 36. Similarly, the tripped position of the rotating assembly 48 is a location that aligns the lines of action 100, 102, 104, 106 to a location that allows the springs 42 to simultaneously urge all of the doors 30, 32, 34, 36 to their closed position.

The interconnection of the rotating assembly 48 to the doors 30, 32, 34, 36 through the linkage arms 50, 52, 54, 56 means that as the doors 30, 32, 34, 36 move toward the open position, the rotating assembly 48 will rotate in a clockwise direction. As the doors 30, 32, 34, 36 move toward the closed position, the rotating assembly 48 will rotate in a counterclockwise direction. The direction of the rotation is as viewed from the top of the trap 10. That rotation of the rotating assembly 48 occurs whether a user of the trap 10 rotates the handle or whether force is exerted on the doors 30, 32, 34, 36 to open them. As can easily be imagined, an animal inside the trap 10 will most likely attempt to open the doors 30, 32, 34, 36 and may do so with all of the force it can muster. A locking mechanism 130 can be used that will prevent the doors 30, 32, 34, 36 from being opened. The locking mechanism 130 locks the rotating assembly 48 and thereby locks the doors 30, 32, 34, 36. The locking mechanism 130 allows rotation of the rotating assembly 48 in one direction, and restrains rotation of the rotating assembly 48 in the opposite direction. The handle 72 obscures the locking mechanism 130 and FIG. 2 shows the handle 72 exploded upwardly from the rotating assembly 48 to reveal the components of the locking mechanism 130 and FIG. 4 shows a completely exploded view of the locking mechanism 130. The locking mechanism 130 includes a ratchet wheel 134 that is a horse shoe shaped element with angled teeth 136 on its outer diameter. The ratchet wheel 134 is riveted to the mounting plate 70 and fixed with respect to the frame 14. The handle 72 has a pawl lever 140 that is biased into contact with the ratchet wheel 134 with spring 142. The pawl lever 140 rotates with respect to the handle 72 about pivot axis 144. As the spring 142 biases the pawl lever 140 into contact with the ratchet wheel 134, teeth 150 on the pawl lever 140 mesh with the teeth 136 on the ratchet wheel. The teeth 150, 136 are angled in such a way that when the spring 142 biases the pawl lever 140 against the ratchet wheel 134, the rotating assembly 48 that carries the handle 72 and pawl lever 140 may rotate in a counterclockwise direction about central axis 46 as viewed from the top. When the rotating assembly 78 is urged in a clockwise direction as viewed from the top, the teeth 150, 136 restrain movement in the clockwise direction. In the case that a user wishes to move the trap 10 to the set position and open the doors 30, 32, 34, 36 with the handle 72, the pawl lever 140 must be disengaged from the ratchet wheel 134. When a user of the trap 10 wishes to open the doors 30, 32, 34, 36, they must pivot the pawl lever 140 about axis 144 toward the handle 72 as shown by arrows 156 in FIG. 7. That movement can be accomplished by squeezing the handle 72 and pawl lever 140 together or that can be accomplished by pushing just the pawl lever 140 toward the handle 72. The springs 42 on the doors 30, 32, 34, 36 exert a stronger force than that of spring 142 on the pawl lever 140. When then pawl lever 140 is pushed toward the handle, the spring 142 will compress before the springs 42, and the teeth 150, 136 will be separated so the handle 72 can be rotated in a clockwise direction as viewed from the top. This allows for one swift and easy motion that can be accomplished by one or two fingers of the user pushing on the pawl lever 140.

When a user of the trap 10 wishes to set the trap 10, he places the trap 10 in the desired location and moves the handle 72 and pawl lever 140 together as shown by arrows 156 in FIG. 7. Then, the handle 72 is rotated in a clockwise direction as viewed from above. The handle 72 and rotating assembly 48 connected thereto is rotated until the sear 80 contacts one of the pins 88, 90. The sear 80 is shaped such that when it strikes either pin 88, 90, the sear 80 will rotate the trigger mechanism 82 into the position shown in FIG. 1. When the trigger mechanism 82 is in the set position shown in FIG. 1, the sear 80 is stopped against pins 88, 90 on the trigger mechanism 82. Once that is complete, the rotating assembly 48 and its components is in the location shown in FIG. 16. When an animal trips the trap 10 by moving the trigger arm 84 in either direction, its tail or other body part may be caught between the doors 30, 32, 34, 36 when they are partially closed as shown in FIG. 7. In that case, the locking mechanism 130 will prevent the animal from pushing on the doors 30, 32, 34, 36 because the rotating assembly will be restrained from rotation in the clockwise direction (as viewed from the top) which is rotating toward the set position. That will give the animal a chance to pull its tail or limb from between the doors 30, 32, 34, 36 and the bias of the springs 42 on the doors 30, 32, 34, 36 will finish closing the doors 30, 32, 34, 36 when the obstruction is removed. When it is time to release the animal from the trap 10, a user will move the trigger mechanism 82 to its lowered position so that the pins 88, 90 are below the sear 80. This will prevent movement of the trigger arm 84 from tripping the trap 10 as the animal finds its way out of the trap because the user must rotate the handle 72 toward the set position to open the doors 30, 32, 34, 36. Once the animal is free, the trigger mechanism 82 can be returned to its raised position so the pins 88, 90 may engage the sear 80. The shape of the sear 80 and its trip surfaces 94, 96 are shaped so that the trigger mechanism 82 is rotated into its set position as shown in FIG. 1 no matter what rotational position the trigger mechanism 82 occupies when either trip surface 94, 96 strikes pin 88 or 90.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A single-handed trap comprising:
   a frame having an opening;
   a door pivotably affixed to said frame adjacent said opening and movable between open and closed positions, said open position defined by said door substantially clear of said opening, said closed position defined by said door obstructing said opening;
   a rotating assembly connected to said door through a linkage and said linkage being pivotally connected to said rotating assembly and pivotally connected to said door, said rotating assembly rotatably affixed to said frame and rotatable between a set position and a tripped position about an axis of said rotating assembly, said rotating assembly including a sear extending radially outward of said axis, when said rotating assembly is in said set position, said door is in said open position, and when said rotating assembly is in said tripped position, said door is urged toward said closed position;
   a spring biasing said door toward its closed position;
   a trigger mechanism pivotably affixed to said frame and pivotable about a trigger axis between set and tripped positions, said set position of said trigger mechanism locating a portion of said trigger mechanism adjacent to said rotating assembly and said tripped position of said trigger mechanism corresponding to a portion of said trigger mechanism having contacted and rotated said rotating assembly to a location where said spring urges said door into said closed position, said trigger mechanism including pins extending therefrom, when said door is in said open position and said rotating assembly is in said set position, said pins are adjacent to said sear, and pivoting said trigger mechanism about said trigger axis causes one of said pins to contact said sear to move said rotating assembly toward said tripped position, wherein said trigger mechanism is shiftable along said trigger axis between a raised position and a lowered position, said raised position of said trigger mechanism locating said pins so they may contact said sear and said lowered position locating said pins below said sear so that said pins cannot contact said sear.

2. The single-handed trap as claimed in claim 1, wherein said rotating assembly is connected to a locking mechanism, said locking mechanism restraining rotation of said rotating assembly toward said set position.

3. The single-handed trap as claimed in claim 2, wherein said locking mechanism is selectively releasable to allow rotation of said rotating assembly toward said set position.

4. The single-handed trap as claimed in claim 1, wherein said spring exerting a force through a linkage pivotally connected to said door and said force acting on said linkage through a line of action which is located to generate a moment about said axis of said rotating assembly that biases said sear against said pins when said rotating assembly is in its set position, rotation of said rotating assembly away from said set position and toward its tripped position a predetermined amount changes the location of said line of action so that said force is in alignment with said axis of said rotating assembly and in equilibrium, rotation of said rotating assembly further away from said set position toward said tripped position beyond the equilibrium locates said line of action so that said force generates a moment urging said rotating assembly toward said tripped position.

5. A single-handed trap comprising:
a frame having an opening;
a door pivotably affixed to said frame adjacent said opening and movable between open and closed positions, said open position defined by said door substantially clear of said opening, said closed position defined by said door obstructing said opening;
a spring biasing said door toward said closed position and exerting a force through a linkage pivotally connected to said door and said force acting on said linkage through a line of action;
a rotating assembly connected to said door through said linkage and said linkage being pivotally connected to said rotating assembly, said rotating assembly rotatably affixed to said frame and rotatable between a set position and a tripped position about an axis of said rotating assembly, when said rotating assembly is in said set position, said door is in said open position, and when said rotating assembly is in said tripped position, said door is urged toward said closed position, said line of action being offset to a first side of said axis of said rotating assembly when said rotating assembly is in said set position wherein said force urges said rotating assembly in a first rotational direction that is restrained from rotation and maintains said door in said open position, and said line of action being offset to a second side of said axis of said rotating assembly that is opposite from said first side of said axis of said rotating assembly when said rotating assembly is in said tripped position wherein said force urges said rotating assembly in a second direction that is opposite to said first rotational direction and facilitates closing said door;
a trigger mechanism pivotably affixed to said frame and movable between set and tripped positions, said set position of said trigger mechanism locating a portion of said trigger mechanism adjacent to said rotating assembly and said tripped position of said trigger mechanism corresponding to said portion of said trigger mechanism having contacted and rotated said rotating assembly to a location where said force acting on said line of action urges said door into said closed position.

6. The single-handed trap as claimed in claim 5, wherein said rotating assembly is connected to a locking mechanism, said locking mechanism restraining rotation of said rotating assembly toward said set position.

7. The single-handed trap as claimed in claim 6, wherein said locking mechanism is selectively releasable to allow rotation of said rotating assembly toward said set position.

8. The single-handed trap as claimed in claim 5, wherein said rotating assembly includes a sear extending radially outward of said axis of said rotating assembly, said trigger mechanism pivotable about a trigger axis and including pins extending therefrom, when said door is in said open position and said rotating assembly is in said set position, said pins are adjacent to said sear, and pivoting of said trigger mechanism about said trigger axis causes one of said pins to contact said sear to move said rotating assembly toward said tripped position.

9. A single-handed trap comprising:
a frame having an opening;
a pair of doors pivotably affixed to said frame adjacent said opening and movable between open and closed positions, said open position defined by said doors substantially clear of said opening, and said closed position defined by said doors obstructing said opening;
a rotating assembly connected to each said door through a linkage and each said linkage being pivotally connected to said rotating assembly and pivotally connected to one of said doors, said rotating assembly rotatably affixed to said frame and rotatable between a set position and a tripped position about an axis of said rotating assembly, when said rotating assembly is in said set position, said doors are in said open position, and when said rotating assembly is in said tripped position, said doors are urged toward said closed position, said rotating assembly being connected to a locking mechanism including a ratchet wheel partially circumscribing said rotating assembly and a pawl pivotally connected to said rotating assembly, said pawl includes teeth that are urged into contact with teeth on said ratchet wheel, said teeth on said pawl and said ratchet wheel allowing movement of said rotating assembly from said set position toward said tripped position, and when said teeth on said pawl and said ratchet wheel are in contact said teeth on said pawl and said ratchet wheel restraining movement of said rotating assembly in a direction toward said set position;
a spring biasing one of said doors towards said closed position and exerting a force through a respective one of said linkages and said force acting on said respective one of said linkages through a line of action; and
a trigger mechanism pivotably affixed to said frame and movable between a set and tripped position, said set position of said trigger mechanism locating a portion of said trigger mechanism adjacent to said rotating assembly and said tripped position of said trigger mechanism corresponding to said portion of said trigger mechanism having contacted and rotated said rotating assembly to a location where said force acting on said respective one of said linkages through said line of action urges said one of said doors into said closed position.

10. The single-handed animal trap as claimed in claim 9, wherein said pawl is selectively disengageable with said ratchet wheel to allow rotation of said rotating assembly toward said set position when said teeth on said pawl are not in contact with said teeth on said ratchet wheel.

11. The single-handed trap as claimed in claim 9, wherein said rotating assembly includes a sear extending radially outward of said axis of said rotating assembly, said trigger mechanism pivotable about a trigger axis and said trigger mechanism including pins extending therefrom, when said doors are in said open position and said rotating assembly is in said set position, said pins are adjacent to said sear, and pivoting of said trigger mechanism about said trigger axis causes one of said pins to contact said sear to move said rotating assembly toward said tripped position.

12. The single-handed trap as claimed in claim 11, wherein said trigger mechanism is shiftable along said trigger axis between a raised position and a lowered positions said raised position of said trigger mechanism locating said pins so they may contact said sear and said lowered position locating said pins below said sear so that said pins cannot contact said sear.

13. The single-handed trap as claimed in claim 11, wherein said sear includes a sear notch and trip surfaces adjacent to said sear notch, said pins contacting said trip surfaces when said trigger mechanism is rotated from said set position toward said tripped position, said trigger axis extending through said sear notch.

14. The single-handed trap as claimed in claim 11, wherein said trigger mechanism includes a nut for biasing said trigger mechanism against a stop to provide additional friction on said trigger mechanism that provides resistance against pivoting about said trigger axis.

* * * * *